Feb. 20, 1940.  A. Y. DODGE  2,190,831
TRANSMISSION
Filed April 30, 1937  7 Sheets-Sheet 1

Fig. 1

INVENTOR.
ADIEL Y. DODGE
BY McConkey & Booth
ATTORNEYS.

Patented Feb. 20, 1940

2,190,831

UNITED STATES PATENT OFFICE 2,190,831

TRANSMISSION

Adiel Y. Dodge, South Bend, Ind.

Application April 30, 1937, Serial No. 139,888

19 Claims. (Cl. 74—189.5)

This invention relates to transmissions and more particularly to infinitely variable automatic transmissions having a plurality of operating ranges.

In the operation of automotive vehicles, and particularly of heavy vehicles such as trucks and buses, variations in road and load conditions and the like make it necessary to provide a transmission having an extremely wide range of torque and speed variations if economical and comfortable operation is to be attained. Heretofore this has required an extremely large and complicated transmission having a large number of selective steps or has involved the sacrifice of speed and economy under favorable load and road conditions in order to permit the use of a smaller transmission.

According to the present invention, these objections are overcome by employing an infinitely variable transmission which operates throughout a plurality of definite speed and torque ranges. That is, the driving ratio between the input and output members of the transmission is infinitely variable throughout a range between upper and lower limits and provision is made for two or more ranges having different limits. Thus low range operation might be employed to give high torque and low speed under unfavorable conditions and high range might be used for higher speeds with less torque under more favorable conditions.

An object of the invention is to provide a transmission including an infinitely variable torque-multiplying unit connected in series multiple with a differential gear set in which the range of torque multiplication through which the transmission is operable can be changed.

Another object of the invention relates to a multi-range transmission in which the change from one range to another is made automatically in response to a function of operating conditions.

Other objects, advantages and novel features of the invention including particular arrangements, desirable sub-combinations and novel elements will be apparent from the following description when read in connection with the accompanying drawings in which:

Figures 3, 4, 5, and 6 are views similar to Figure 1 of other forms of transmission embodying the invention;

Figures 8, 9 and 10 are partial views similar to Figure 1 of still further transmissions embodying the invention.

Figure 1:
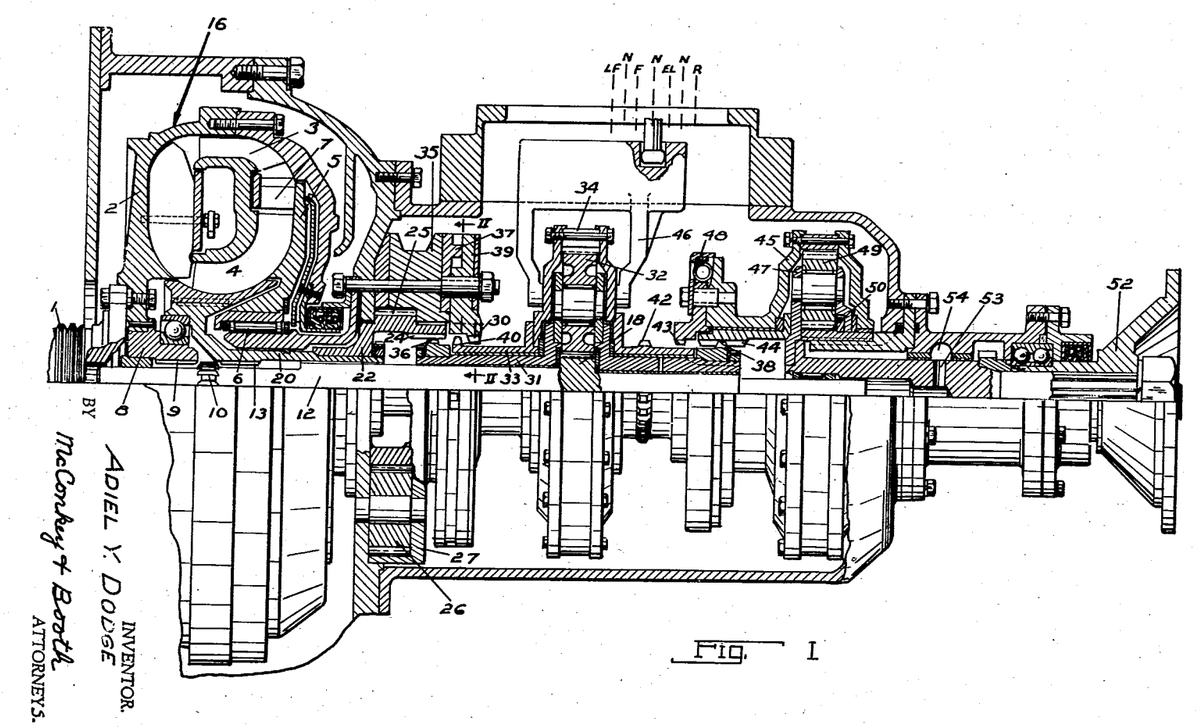
Figure 1 is an axial section with parts in elevation of a transmission embodying the invention.

The transmission shown in Figure 1 includes a driving shaft 1 which may be the crankshaft of an internal combustion engine and which is connected to a vaned impeller 2. A rotor carried by a sleeve 20 has two sets of vanes 3 and 4 lying adjacent the inlet and outlet ends of the impeller vanes and a stator 5 mounted on a combined one-way clutch and bearing 6 carries a set of vanes 7 lying between the rotor vanes 3 and 4, the stator forming a fulcrum for hydraulic torque multiplication. The impeller, rotor and stator assembly forms a hydraulic torque converter, as indicated as a whole at 16 and may take the form of the torque converter more particularly described and claimed in my copending application Serial No. 57,520.

The driving shaft 1 carries an annular extension 8 formed with a series of clutch teeth 9 adapted to mesh with teeth 10 formed on a central shaft 12 which is formed with or rigidly carries a sun gear 18. A similar set of teeth 13 is formed on the rotor sleeve 20 so that the shaft 12 can be connected either to the driving shaft or to the rotor.

The rotor sleeve 20 is formed with an offset extension 22 having a set of internal clutch teeth 24 and formed with an external set of gear teeth 25. A pinion 26 meshes with the teeth 25 and the two are enclosed in a casing 27 to form a gear pump for circulating liquid through the torque converter and for lubrication purposes. By throttling the discharge from this gear pump a hydraulic rotor brake is produced to retard the rotor during shifting. Spaced from the clutch teeth 24 is a second set of stationary clutch teeth 30 for a purpose to appear later.

A gear carrier 31 is sleeved on the shaft 12 and carries a set of planet pinions 32 meshing with the sun gear 18 and with a ring gear 34 carried by a sleeve 33 which is rotatable on the carrier 31. The gear carrier 31 is provided with sets of clutch teeth 36 and 38 on opposite ends thereof and similar sets of clutch teeth 40 and 42 are formed on the ring gear sleeve 33. The teeth 40 are adapted to mesh with either the teeth 24 or 30 and the teeth 36 are also adapted to mesh with the teeth 30 but both the teeth 24 and 36 are shortened so that they will clear without engaging.

In order to avoid the necessity for shifting through the teeth 30 when it is not necessary to do so, these teeth are slidably mounted on a stationary block 35 and are provided with notches to receive a cam portion 37 (Figure 2) on a ring 39. The ring 39 is controlled by a crank 41 which may be operated manually from any convenient control point. When the ring 39 is in the position shown in Figure 2 the teeth 30 are moved outwardly so they will not engage either teeth 36 or 40 but if the ring 39 is turned clockwise the cam portion 37 will move the teeth inwardly into operative position. This arrangement facilitates shifting by making it possible to keep the teeth 30 out of the way except when they are needed.

The two sets of teeth 38 and 42 are adapted to be selectively engaged with sets of teeth 43 and 44 carried respectively by a ring gear 45 and a planet carrier 47. The teeth 43 are mounted on the ring gear 45 for limited rotational movement and are urged toward center by compression springs 48 to provide a yielding coupling to facilitate shifting of the clutch teeth. A set of planet pinions 49 are rotatably mounted on the carrier 47 in mesh with the ring gear 45 and with a sun gear 50 which is fixedly splined to the transmission housing.

The driven shaft of the transmission is indicated at 52 and is counterbored to receive the end of the shaft 12 and the driven shaft is drilled at 53 to connect an annular cavity 54 in the transmission housing to the end of the shaft 12. The shaft 12 is also preferably drilled with suitable oil passages not shown to provide for circulation of liquid by the gear pump 25', 26, 27 through the torque converter and through the cavity 54 and bore 53, the bore in the shaft 12 preferably being connected by cross bores with the several bearings around the shaft to provide lubrication therefor.

The clutches are shifted by means of a yoke 46 engaging the ring gear 34 to shift the first planetary unit and the shaft 12 longitudinally. In the position shown the parts are in neutral position with the shaft 12 and the rotor sleeve 20 free to rotate. If the yoke 46 is shifted to the extreme left teeth 9 and 10 will engage to connect the driving shaft 1 to the shaft 12, teeth 24 and 40 will engage to connect the rotor to the ring gear 34 and teeth 38 and 43 will engage to connect the gear carrier 31 to the ring gear 45. This is the low range forward position in which the sun gear 18 is connected to the driving shaft and the impeller 2, the rotor drives the ring gear 34 and the planet gears 32 and carrier 31 are driven jointly by the sun and ring gears, as more fully described and claimed in my copending application Serial No. 723,083. The carrier 31 drives the ring gear 45 which drives the planet gear 49 and carrier 47 at reduced speed since the sun gear 50 is held stationary. Thus the transmission operates at torque ratios varying infinitely from the maximum of which it is capable up to the ratio for which the gear set 45, 49, 50 is designed when the torque converter is operating at one-to-one.

If the yoke 46 is shifted to the right the transmission passes first through a neutral position in which the clutch teeth 38 disengage the teeth 43 into a position in which teeth 38 engage teeth 44, the sets of teeth 9 and 10 and 24 and 40 remaining in engagement. This is the high range forward position in which the gear carrier 31 is driven as before by a two-path power circuit from the driving shaft but is connected directly to the gear carrier 47 which is rigid with the driven shaft, the ring gear 45 being free to turn. Thus the transmission operates at torque ratios varying infinitely from the maximum developed at the gear carrier 31 up to one-to-one.

A further shift to the right passes through the center neutral shown into a position with the teeth 10 and 13 in engagement, teeth 40 and 30 in engagement, and teeth 38 and 44 remaining engaged. The teeth 30 are moved inwardly at this time into engagement with the teeth 40 but if it is desired to go directly into reverse as described later the teeth 30 may be withdrawn by operating the cam ring 39 to leave the ring gear 34 free. With the teeth 30 and 40 engaged the ring gear 34 is held stationary and the gear carrier 31 will be positively driven by the sun gear 18 which is driven by the rotor. This is called the emergency low position and is particularly useful in descending slippery hills etc. since the braking effect of the engine can be utilized through the torque converter.

Still further shifting of the yoke 46 to the right passes the transmission through another neutral in which teeth 30 and 40 are disengaged into reverse with teeth 30 and 36 engaged, teeth 42 and 43 engaged, and teeth 10 and 13 still in engagement. In this position the gear carrier 31 is held stationary, the sun gear 18 is driven by the rotor and the ring gear 34 is connected to the driven shaft so that the driven shaft will be turned backwards.

Figure 3 illustrates another form of transmission in which parts corresponding to like parts in Figure 1 have been indicated by the same reference numbers plus 100. In this form the teeth 109 and 110 are permanently in mesh and the several clutch members on the ring gear 134 and gear carrier 131 are omitted. In their place the head 122 on the rotor sleeve 120 carries a double conical clutch member 124 adapted to be engaged by friction members 155 carried by a clutch head 140 which is connected to the ring gear 134. One of the friction members 155 is slidably splined to the head 140 and is controlled by the yoke 146 through suitable clutch rods 156. When the yoke 146 is moved to the right it relieves the pressure between members 124 and 155 to disengage the clutch and when it is moved to the left the members are frictionally engaged to provide a driving connection.

The gear carrier 131 is permanently connected to a gear 157 which rotatably receives the end of the driven shaft 152 and which drives a lay shaft 158 through a gear 159. The lay shaft rigidly carries a gear 160 meshing with a gear 161 which is rotatable on the driven shaft 152 and a second gear 162 drivably connected through an idler, not shown, with a gear 163 which is rotatable on the driven shaft. A double clutch member 164 is slidably splined on the driven shaft and carries clutches adapted to engage corresponding clutches on the gears 157 and 161 respectively and a similar single clutch member 165 is adapted to engage a clutch on the gear 163.

The parts are shown in neutral position and for low range forward the clutch 164 is shifted into engagement with the gear 161 to connect this gear to the driven shaft, the clutch 124, 155 being disengaged by operating the yoke 146 to facilitate this shifting. In this position the gear 157 will be driven by the two path power circuit more fully described above and will drive the driven shaft through gear 159, lay shaft 158 and gears 160 and 161. Thus the transmission will operate at torque ratios varying infinitely from the maximum of which it is capable up to that of the gears 157, 159, 160 and 161.

For high range forward the clutch member 164 is shifted into engagement with the gear 157 to connect the driven shaft directly to the gear carrier 131. In this position the transmission will operate at torque ratios varying from the maximum developed on the gear carrier 131 up to one-to-one. For reverse the clutch member 165 is engaged with the gear 163 to drive the driven shaft 152 reversely.

Figure 4:
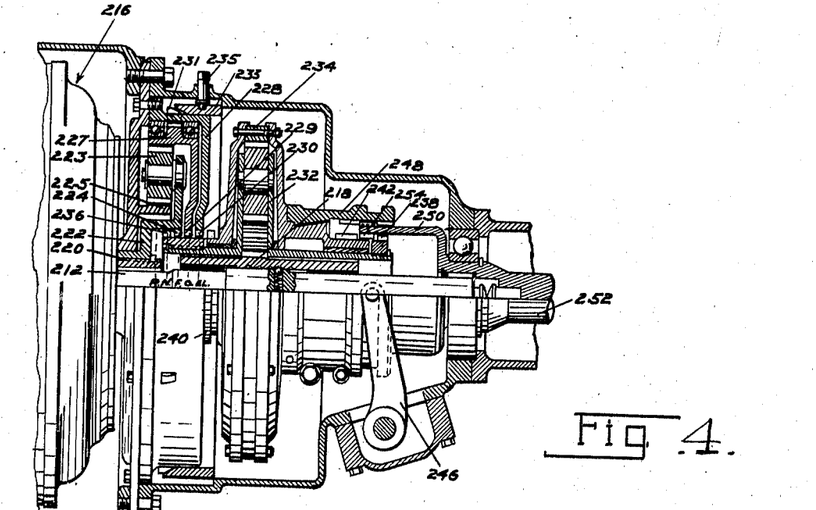

Figure 4 illustrates another form of transmission, parts therein which are similar to like parts in Figure 1 being indicated by the same reference numerals plus 200. In this construction the planet gears 232 are in pairs to reverse the normal drive and the sleeve 222 which is driven by the rotor of the hydraulic unit 216 through the sleeve 220 carries a set of planet gears 223 which mesh with a sun gear 225 carried by a fixed part of the casing and with a ring gear 227 which is rotatable in the casing and carries a clutch element 229. The sun gear 218 is splined to the shaft 212 and the ring gear 227 is rotatably mounted in a stationary sleeve 228 in the casing and has a series of grooves or notches in its outer periphery to be engaged by keys 231, the grooves and keys preferably being constructed in the same manner as the grooves and keys shown in my copending application Serial No. 34,303. The keys 231 are cammed into locking position by a sleeve 233 which is slidable on the sleeve 228 and which may be controlled by cranks 235.

The lines R, N, F, O, and EL indicate the various positions of the clutch 236 for different driving connections, the parts being shown in the N or neutral position in which all of the clutches are disconnected. When the parts are shifted to the R or reverse position clutches 230 and 240 and 238 and 254 will be engaged to lock the ring gear 234 and connect the planet carrier 232 to the driven shaft. Since the planet gears 232 are double the carrier will be driven in the reverse direction.

When clutch 236 is shifted to the F or normal forward position it engages clutch 224 and clutches 242 and 254 are also engaged. Thus the rotor of the hydraulic unit 216 is connected to the planet carrier 232 and the ring gear 234 is connected to the driven shaft. This is the low range forward drive position in which the hydraulic unit and the planetary gear set are connected in series multiple and in which various intermediate torque and speed ratios are produced automatically varying from the maximum of which the transmission is capable until the torque converter is turning at one-to-one.

To obtain high range operation, which in this form is in the nature of an overdrive, the clutch 236 is shifted to its O position in mesh with clutch 229, the clutches 242 and 254 remaining in mesh. In this position the rotor of the hydraulic unit, through the sleeves 220 and 222, drives the planet gears 223 in the forward direction. Since the sun gear 225 is stationary the ring gear 227 will be driven forwardly at an increased speed to drive the clutch 229 and carrier 232 forwardly at increased speed. Thus the driven shaft 252 will be driven faster than the drive shaft 212.

If the clutch 236 is shifted into its EL position in mesh with the stationary clutch 230, the gear carrier will be locked and a positive low gear drive will be produced as described in connection with Figure 1.

When the clutch 236 is in either of its F, O or EL positions, the crank 235 may be operated to shift the sleeve 233 and cam the keys 231 into engagement with the ring gear 227 to produce a hydraulic braking effect in the hydraulic unit. It will be noted that when the keys 231 are cammed inwardly the ring gear 227 will be held stationary and since the sun gear 225 is fixed, the planet gears 223 and the sleeves 222 and 220 and the hydraulic rotor will be held stationary. At this time any rotation of the driving shaft as by momentum of the vehicle will be resisted in the hydraulic unit by reaction of the liquid on the stationary rotor to produce a hydraulic braking effect which may supplement the braking effect of the engine.

Figure 5:
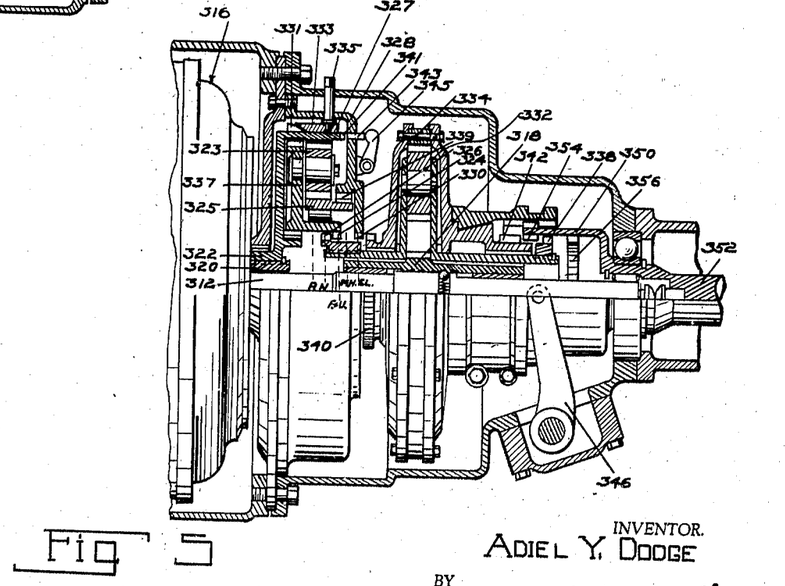

Figure 5 illustrates another arrangement in which parts corresponding to like parts in Figure 1 are indicated by the same reference numerals plus 300. The arrangement of Figure 4 is particularly adapted to be used in connection with rear axle gears having a relatively high speed ratio (low numerical ratio) such that a direct drive through the transmission produces the desired ratio between the engine and driving wheels for driving on level roads. In hilly country or in traffic and where a higher numerical ratio range of operation is desirable this transmission may be shifted into lower range drive. Figure 5 shows an arrangement for use with a rear axle gear having a relatively low ratio such that a direct drive through the transmission produces an engine to wheel ratio substantially the same as the high range engine to wheel ratio of Figure 4 and in which a lower range drive through the auxiliary transmission is desirable for use in hilly country or in traffic.

In the modification of Figure 5, the sleeve 322 is formed integral with the ring gear 327 and the planet gears are mounted on a carrier 337 which is freely rotatable in the sleeve 322 and which carries the clutch 324. The sun gear 325 is rotatably mounted on the carrier 337 and is held against reverse rotation by a combined one-way brake and bearing 339 which engages the sun gear and the stationary sleeve 328. The keys 331 extend through the sleeve 322 and are engageable with the carrier 337, the collar 333 which operates the keys being controlled by a crank 335 which is journaled in the sleeve 328.

The neutral and reverse positions are the same in Figure 5 as in Figure 4. For forward drive either at low or high range the clutch 326 is shifted to the F and U position to engage clutch 324 and the clutches 342 and 354 will be engaged to connect the hydraulic rotor through the gearing 323, 325 and 327 to the carrier 332 and the ring gear 334 to the driven shaft 352. If the keys 331 are cammed in to lock the sleeve 322 and the carrier 327 the carrier 332 will be driven at the same rate of speed as the rotor to produce high range operation but if the keys 331 are out of operative position the carrier 332 will be driven through the gearing at a reduced rate in the same direction to produce low range operation.

If the clutch 326 is shifted to the MH or manual high position it will be completely disengaged but clutches 342 and 354 will remain in engagement and clutch 338 will engage clutch teeth 356 formed on the sleeve 350. Thus both the carrier 332 and the ring gear 334 will be connected to the driven shaft and the gearing will rotate as a unit to produce a positive one-to-one drive. Further shifting of the clutch 326 to its EL or emergency low position engages it with the fixed brake 330 and disengages the clutches 338 and 356 to lock the carrier 332 and produce a positive low gear drive.

In order to obtain a hydraulic braking effect with the transmission of Figure 5 the sleeve 322 is provided with a series of teeth 341 adapted to be engaged by a sliding key 343 carried by the fixed sleeve 328 and which is controlled by a suitable operating lever 345. When the key 343 is moved into engagement with the teeth 341 the sleeve 322 and the hydraulic rotor will be held stationary and if the transmission is in either its MH or EL position momentum of the car tending to turn the driven and driving shafts will be resisted by liquid in the hydraulic unit reacting against the fixed rotor.

Figure 6:
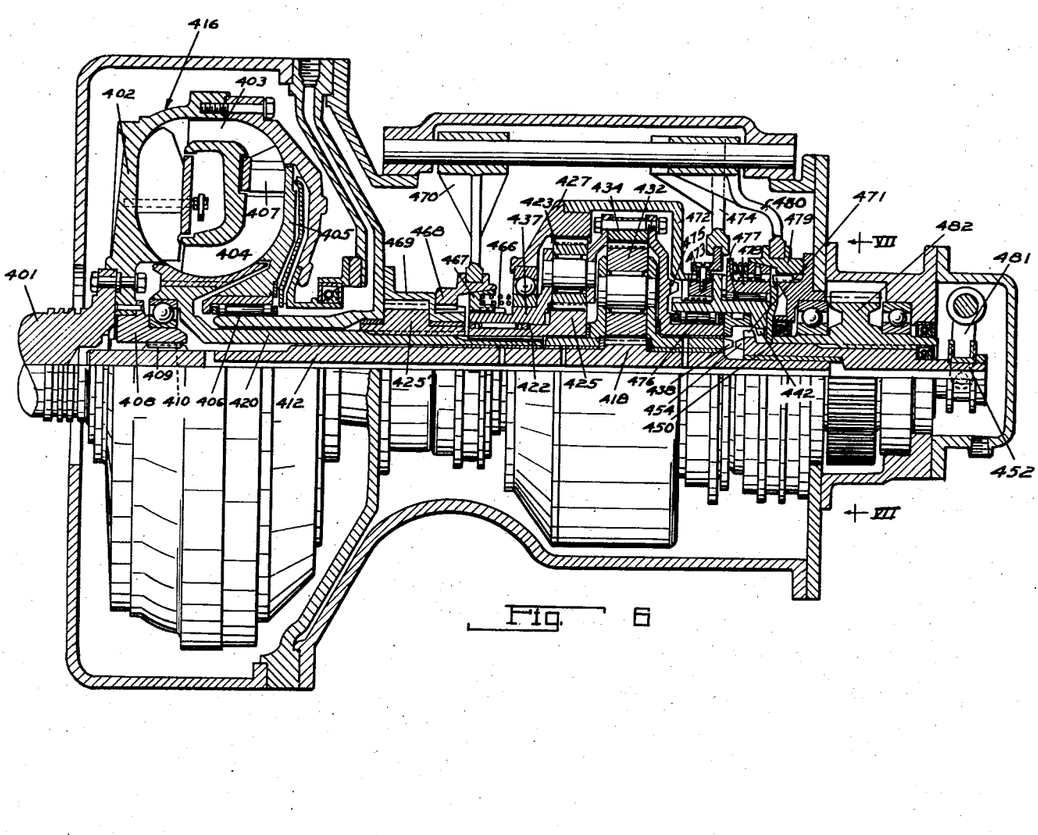
Figure 7:
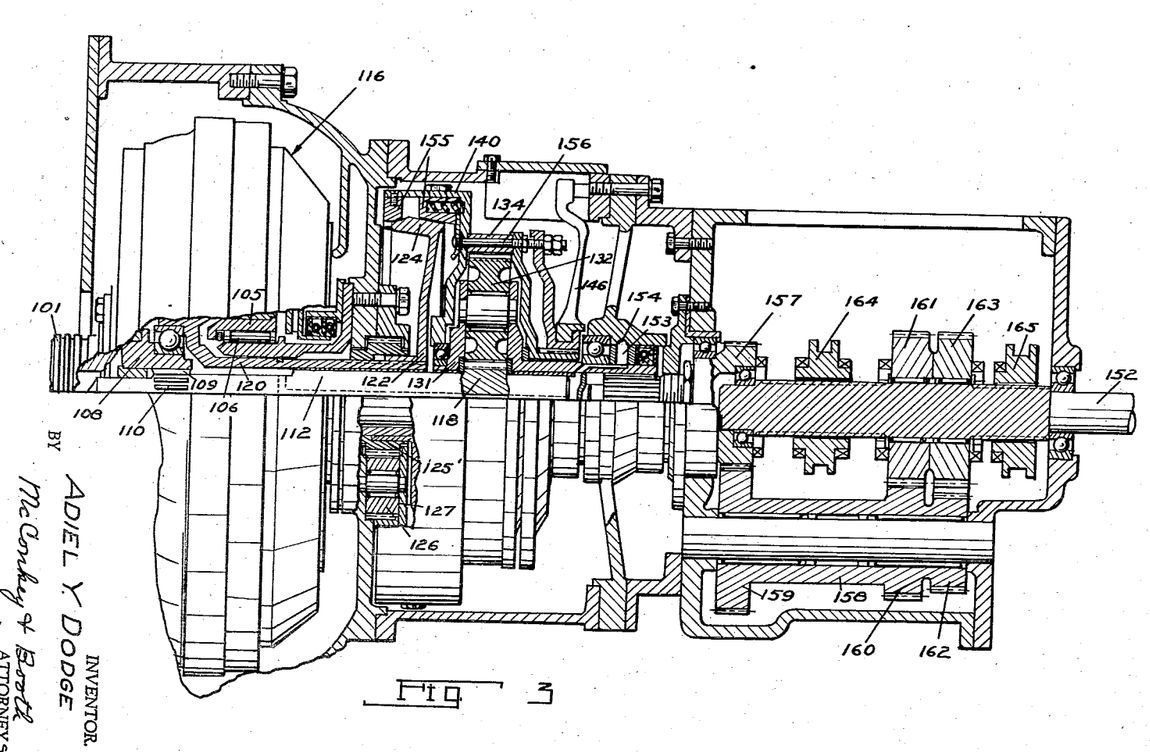

Figure 6 illustrates another arrangement, parts therein corresponding to like parts in Figure 5 being designated by the same reference numbers plus 100 and to like parts in Figure 1 being designated by the same reference numbers plus 400. In this construction the rotor sleeve 420 is connected to a head 422 which carries the sun gear 425. The planet gears 423 are carried by a gear carrier 437 which is rigidly connected to the wing gear 434 and which is formed with a set of clutch teeth 466 preferably carrying a synchro-mesh device 467 and adapted to be engaged by a clutch member 468 splined to a stationary part 469. The clutch member 468 is controlled by a shifting yoke 470.

The gear carrier 432 is formed with a set of clutch teeth 438 adapted to be engaged by teeth 454 on a sleeved extension 450 of the driven shaft and another set of teeth 471 on the extension 450 is adapted to mesh with teeth 442 on an extension 472 of the ring gear 427. The extension 472 slidably carries a clutch member 473 controlled by a shifting yoke 474 and adapted to engage a set of teeth 475 on the ring gear 434. A combined one-way clutch and bearing 476 connects the extension 472 and the ring gear 434 to prevent the extension from turning faster in a forward direction than the ring gear 434. A second combined one-way clutch and bearing 477 mounts a sleeve 478 on the extension 472, the sleeve being formed with clutch teeth for engagement by a clutch member 479 which is carried by a stationary housing part. A suitable yoke 480 is provided to control the clutch member 479.

Figures 2, 7:
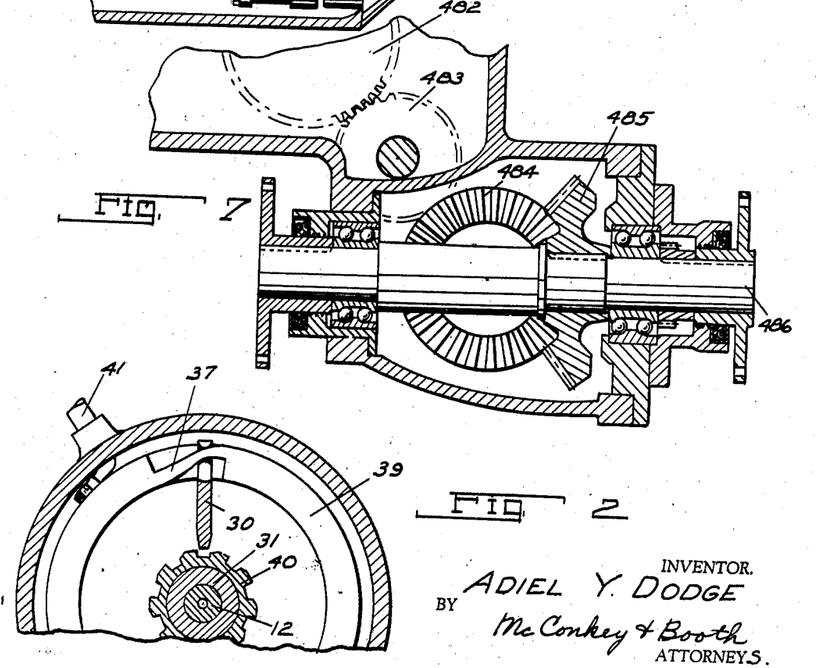
Figure 2 is a partial section on the line II—II of Figure 1.
Figure 7 is a partial section on the line VII—VII of Figure 6.

The driven shaft 452 is adapted to be shifted longitudinally by a shift yoke 481 and has splined thereto a driven gear 482. As best seen in Figure 7 the gear 482 drives an idler pinion 483 which drives a compound gear 484 meshing with a bevel gear 485 on a transverse driven shaft. This arrangement is particularly useful in rear engine vehicles, the shaft 486 forming the vehicle axle.

The several shifting yokes are preferably shifted by means of fluid pressure or vacuum cylinders or by solenoids, not shown, so that the several shifting operations can be performed by a single control movement by an operator. In the position shown the transmission is in neutral. For low range forward drive the clutch member 479 is moved to the left to engage the ring 478 and hold it stationary and the driven shaft is shifted to the left to engage teeth 438 and 454. At this time the sun gear 425 is turned forwardly by the rotor and the clutch 477 holds the ring gear 427 against reverse rotation so that the ring gear 434 is turned forward at reduced speed and increased torque. The sun gear 418 is turned forward by the driving shaft so that the gear carrier 432 and the driven shaft will be driven forward by the joint operation of the sun gear 418 and the ring gear 434. Thus the transmission operates at torques varying infinitely from the maximum of which it is capable to that produced by the combined effect of the gear sets as the torque converter approaches one-to-one.

For high range forward drive the clutch member 473 is shifted to the left to engage the teeth 475 thereby to lock the ring gears 427 and 434 together. This shift is facilitated by reducing the engine speed until the driven shaft tends to over-run, the one-way clutch 476 coming into operation at this time to insure perfect synchronization of the two ring gears. Preferably the clutch member 479 is shifted to the right to disengage the ring 478 although this is not essential since the clutch 476 can over-run. In this position the gear set 425, 423, 427 is locked to rotate as a unit and the ring gear 434 will be driven directly by the rotor. Thus the transmission will operate at a higher speed and lower torque range finally reaching one-to-one drive.

For reverse the clutch member 468 is shifted to the right to engage the teeth 466 and hold the gear carrier 437 stationary, the clutch member 473 is shifted to the right to disengage the teeth 475 and the driven shaft is shifted to the right to engage the teeth 442 and 471. In this position the ring gear 427 is connected to the driven shaft and is driven in the reverse direction by the rotor through the gears 425 and 423.

Figure 8:
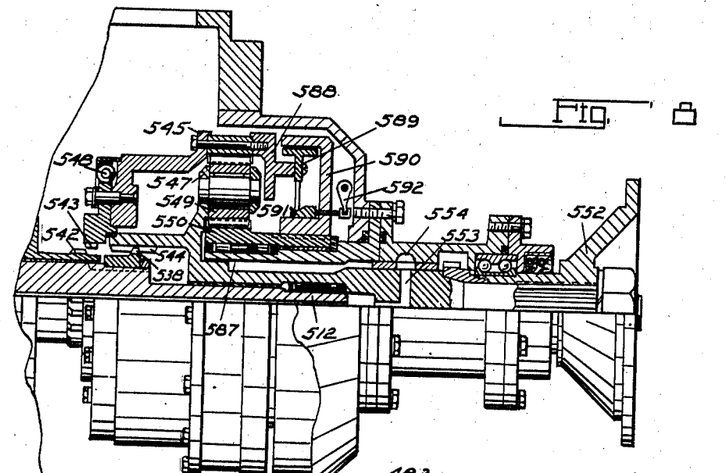

Figure 8 shows another arrangement adapted particularly to replace the second gear set of Figure 1 and parts therein corresponding to like parts in Figure 1 are indicated by the same reference numbers plus 500. In this arrangement the sun gear 550 is mounted on a combined one-way clutch and bearing 587 which prevents reverse rotation thereof and the ring gear 545 has a radial flange 588 on which a plurality of speed responsive clutch shoes are pivotally mounted. The clutch shoes are adapted to engage a flange 590 connected to the sun gear and may be moved out of engagement manually by a cam ring 591 controlled by a shift member 592. The details of the clutch are more fully described and claimed in my Patent No. 2,048,435.

The parts are shown in the high range position in which the clutch teeth 538 and 544 are engaged to connect the gear carrier of the first gear set directly to the gear carrier 547 and the driven shaft. In this position the transmission will operate at torque ratios varying from the maximum at which the gear carrier of the first gear set can be driven up to one-to-one.

For low range drive the first gear set is shifted to the left to engage the clutch teeth 538 and 543 to connect the gear carrier of the first set with the ring gear 545. In this position the ring gear 545 will be driven forward to drive the carrier 547 forward at reduced speed and increased torque. As the speed of operation increases to a predetermined point the clutch 589 will operate to connect the ring gear 545 to the sun gear 550. This locks the second gear set and automatically produces high range operation, the first gear set being shifted to the high range position shown at this time if desired. Should the speed drop the clutch 589 will automatically disengage and low range operation will be resumed if the parts have been allowed to remain in low range position.

If it is desired to retain low range operation regardless of speed, the ring 591 may be shifted to the left by means of the member 592 to lock the clutch 589 out of engagement.

Figure 9 illustrates a further form of transmission somewhat similar to that shown in Figure 8 and parts therein corresponding to like parts in Figure 8 are indicated by the same reference numbers plus 100, parts corresponding to like parts in Figure 1 being indicated by the same reference numbers plus 600. In this form the ring gear 645 carries an elongated set of clutch teeth 643 adapted to engage with either the teeth 638 or 642 on the gear carrier and ring gear respectively of the first gear set and the gear carrier 647 carries no such clutch teeth. The sun gear 650 is rotatably mounted on a fixed sleeve surrounding the driven shaft 652 and has slidably splined thereto a collar member 693 which is formed on its opposite ends with sets of clutch teeth 694 and 695. The teeth 694 are adapted to engage teeth 696 on the gear carrier 647 and the teeth 695 are adapted to engage a set of stationary teeth 697 which is carried by the transmission housing.

In order to facilitate engagement of the above-described sets of teeth, the member 693 carries a pair of oppositely-facing clutch and brake discs 698 and 699 adapted to engage respectively with clutch member 701 and brake member 702 on the ring gear 645 and on the transmission housing respectively. The discs 698 and 699 are yieldingly urged apart by a spring 703 and function to synchronize the speed of the member 693 with the ring gear 645 or the stationary housing according to its direction of movement.

The member 693 is adapted to be shifted automatically and for this purpose there is illustrated diagrammatically an automatic shift mechanism responsive to the speed of the driven shaft. The member 693 carries by means of a suitable ball bearing a ring 704 which is connected to a shift rod 705 through a second bearing. The rod 705 is directly connected to the piston of a vacuum motor 706 which is connected through a control valve 707 to the intake manifold of an internal combustion engine or other suitable source of vacuum. The valve 707 is controlled by a speed responsive governor 708 driven from the shaft 652 by suitable gearing.

As shown in Figure 9 the member 693 is in neutral position, a position it may also occupy during all shifts of 646, thus facilitating shifts by 646. If the driven shaft 652 is stationary or is turning below the speed for which the device 708 is set, it will operate the valve 707 to connect the right end of the cylinder 706 to the source of vacuum thereby to shift the member 693 to the right. This will engage the teeth 695 and 697 to hold the sun gear 650 stationary. As the motor operates the gear carrier sleeve 631 will be driven jointly by the driving shaft and the rotor of the torque converter as described more fully in connection with Figure 1 to drive the ring gear 645 at torque ratios varying infinitely up to one-to-one. Since the sun gear 650 is held stationary the ring gear 645 will drive the planet pinions 649 and the carrier 647 at reduced speed and increased torque.

If the speed is increased to that for which the device 708 is set, the valve 707 will be shifted to admit atmospheric pressure to the right end of the cylinder 706 to connect the left end thereof to the source of vacuum. This will shift the member 693 to the left to bring the teeth 694 and 696 into engagement thereby to connect the sun gear 650 to the gear carrier 647 so that the gear set will operate as a unit. It will be noted that the clutch 698, 701 connects the sun gear to the ring gear 645 thereby tending to lock the gear set so that the teeth 694, 696 can be shifted into engagement easily. This is the high range position in which the speed torque ratios between the driving and driven shafts vary up to one-to-one.

Figure 10:
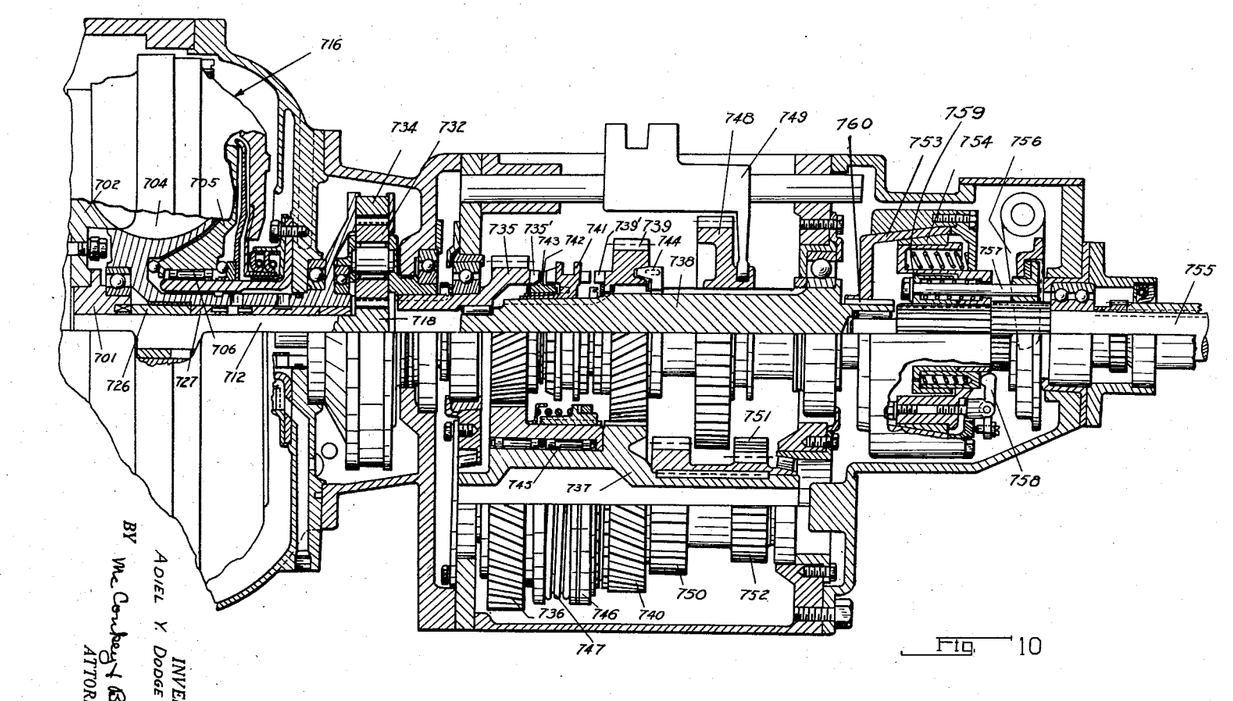

Figure 10 illustrates a transmission embodying the invention designed particularly for use on trucks or other heavy vehicles, parts therein corresponding to like parts in Figure 1 being indicated by the same reference numbers plus 700. In this construction the shaft 712 is rigidly connected to or forms an extension of the driving shaft 701 and the rotor 704 is permanently connected to the ring gear 734. The gear pump of Figure 1 is replaced by a sliding vane pump including a cam sleeve 726 carried by the shaft 712 and a vane 727 slidably carried by a stationary housing part and engaging the cam sleeve. As the shaft 712 and the sleeve 726 rotate liquid will be pumped through the torque converter in the same manner that it is circulated by the gear pump of Figure 1.

The carrier for planet gears 732 is permanently connected to a gear 735 which is in mesh with a gear 736 on a lay shaft 737. A driven shaft 738 is rotatably mounted coaxially with the gear 735 and rotatably carries a gear 739 meshing with a gear 740 on the lay shaft. The gears 735 and 739 carry facing clutch teeth 735' and 739' adapted to be engaged by a shiftable clutch member 741 which is splined on the driven shaft 738.

To facilitate shifting of the clutch member 741, it is provided with a friction clutch 742 carrying a set of tapered clutch teeth 743 adapted to engage the teeth 735' and axial pressure thereon presses the clutch 742 more tightly into engagement, thereby tending to pick up the shaft 738 and drive it at the same speed as the gear 735. Further shifting of the clutch 741 brings it into engagement with the teeth 735' and positively connects the gear 735 and shaft 738.

The gear 739 is mounted for slight axial movement on the shaft 738 and is formed with a tapered surface for frictional engagement with a clutch member 744 carried by the shaft. Thus as the clutch member 741 is shifted to the right it forces the gear 739 into engagement with the member 744 so that both the clutch member and the gear tend to turn at the same speed.

The gear 736 is rotatably mounted on the lay shaft 737 by means of a combined one-way clutch and bearing 745 which will permit the lay shaft to overrun the gear in the normal direction of rotation but through which the gear will drive the lay shaft. The clutch 745 may be locked out by a clutch collar 746 splined on the gear 736 and engageable with teeth on the shaft to lock the gear and shaft together. A spring 747 urges the collar into engagement with the shaft and any suitable manual means, not shown, may be provided to move it out of engagement.

A gear 748 is slidably splined on the driven shaft 738 and is adapted to be shifted by a yoke 749 into engagement either with a gear 750 on the lay shaft or with a reverse idler 751 driven by a gear 752 on the lay shaft.

The driven shaft 738 is connected to a clutch cone 753 adapted to be engaged by a friction cone 754 carried by a shaft 755 which may be connected to the propeller shaft of the vehicle. The friction cone is controlled by a yoke 756 connected thereto by rods 757, levers 758 being provided to reduce the force necessary to compress the coiled springs when disengaging the cones 753 and 754. When this clutch is disengaged there is no load on the driven shaft 738 and the several gears may be shifted easily. When the cones are engaged the driven and propeller shafts are first operably connected by their frictional engagement. Directly thereafter positive engagement takes place due to continued movement of a sleeve 759 on splines on the shaft 755 to a position engaging splines 760 on the end of shaft 738 to lock the two shafts together.

For low range operation the gear 748 is shifted into engagement with the gear 750 to provide a low gear transmission in series with the automatic unit including the hydraulic torque converter and planetary gear set. Thus when the hydraulic unit is operating at direct drive the ratio between the driving and driven shafts will be that determined by the relative sizes of gears 735, 736, 748 and 750. For intermediate range the gears 748 and 750 are disengaged and the clutch 741 is moved into engagement with the gear 739. At this time the ratio between the driving and driven shafts when the hydraulic unit is operating at one to one is determined by the gears 735, 736, 739 and 740. For high range the clutch 741 is shifted into engagement with the gear 735 so that the ratio between the driving and driven shafts is determined solely by the hydraulic unit.

While several embodiments of the invention have been shown and described it will be apparent that many changes might be made and it is not intended to limit the scope of the invention to the forms shown or otherwise than by the terms of the appended claims.

What is claimed is:

1. A transmission comprising an infinitely variable torque multiplying unit having a driving member, a driven member and a reaction member forming a fulcrum for torque multiplication, a pair of gear sets, the first of said gear sets having two driving elements connected to be driven by said driving and driven members respectively and a third element driven jointly by said two elements, the second gear set being connected in series with one of the elements of said first gear set, and means for changing the driving ratio of said second gear set while said first gear set transmits varying torque thereby to change the operating range of the transmission.

2. A transmission comprising a hydraulic torque converter having an impeller, a rotor and a stator forming a fulcrum for torque multiplication, a pair of planetary gear sets, one of said gear sets having two driving elements connected to be driven by said impeller and said rotor respectively and a third element driven jointly by said two elements, the other gear set having one element connected with the third element of said first gear set and a second element connected to a driven member, and means for either driving or stalling a third element of said other gear set thereby to change the operating range of the transmission.

3. A transmission comprising an infinitely variable torque multiplying unit having a driving member, a driven member and a reaction member forming a fulcrum for torque multiplication, a pair of gear sets, one of said gear sets having two driving elements connected to be driven by said driving and driven members respectively and a third element driven jointly by said two elements, the other gear set being connected in series with one of the elements of said first gear set, and means for locking said other gear set to turn as a unit thereby further to change the operating range of the transmission, while the first mentioned gear set operates at ratios other than one to one.

4. A transmission comprising an infinitely variable torque multiplying unit having a driving member, a driven member and a reaction member forming a fulcrum for torque multiplication, a pair of gear sets, one of said gear sets having two driving elements connected to be driven by said driving and driven members respectively and a third element driven jointly by said two elements, the other gear set being connected in series with one of the elements of said first gear set, and means automatically operable in response to the speed of the driven element of said other gear set to change the operating ratio of said other gear set.

5. A transmission comprising an infinitely-variable torque-multiplying unit including a driving member, a driven member and a reaction member forming a fulcrum for torque multiplication, a differential gear set having two members connected respectively to the driving and driven members of said unit and a third member driven jointly by said two members, gear reduction means including a reaction member, and a driving element driven by said third member, and means for changing the operating ratio of said gear reduction means, while said differential gear set continues to operate at variable ratios.

6. A transmission comprising a hydraulic torque converter including a driving member, a driven member and a stator forming a fulcrum for torque multiplication, a differential gear set having two members connected respectively to the driving and driven members of said torque converter, and a third member driven jointly by said two members, gear reduction means including a reaction member, and a driving element driven by said third member, and means for changing the operating ratio of said gear reduction means, while said differential gear set continues to operate at variable ratios.

7. An infinitely variable torque transmission for connecting a driving and a driven shaft comprising a hydraulic unit connected to the driving shaft, a planetary gear chain having one element connected to the driving shaft and another element connected to the driven shaft, means drivably connecting a third element of said gear chain to the hydraulic unit, and means to change the driving ratio of said means, so that the variable torque transmitted by the planetary gear chain may be varied over a wider range.

8. A transmission comprising a hydraulic torque converter having an impeller, a rotor and a stator forming a fulcrum for torque multiplication, a differential gear set, shiftable clutch means for connecting one element of said gear set to the impeller and another element of the gear set to the rotor, a second gear set, clutch means for connecting said second gear set in series with one of the elements of the first gear set, and means to shift the first gear set axially to shift said clutch means.

9. A transmission comprising a hydraulic torque converter having an impeller, a rotor and a stator forming a fulcrum for torque multiplication, a differential gear set, shiftable clutch means for connecting one element of said gear set to the impeller and another element of the gear set to the rotor, said gear set having a third element driven jointly by said two elements and having clutch means, a second gear set having clutch means adapted to engage said last named clutch means, and means to shift the first gear set axially to shift said clutch means.

10. A transmission comprising a hydraulic torque converter having an impeller, a rotor and a stator forming a fulcrum for torque multiplication, a differential gear set, means to connect one element of the gear set to the impeller, shiftable clutch means on two other elements of the gear set to connect them selectively to the rotor, a second gear set having a driving element and another element geared thereto, shiftable clutch means to connect said elements of the second gear set selectively to said two other elements of the first gear set and means to shift said first gear set to shift said clutch means.

11. A transmission comprising a hydraulic torque converter having an impeller, a rotor and a stator forming a fulcrum for torque multiplication, a differential gear set, means to connect one element of the gear set to the impeller, shiftable clutch means on two other elements of the gear set to connect them selectively to the rotor, a second gear set having a driving element and another element geared thereto, shiftable clutch means to connect said elements of the second gear set selectively to said two other elements of the first gear set, and means to lock out said second gear set for rotation as a unit, thereby to change the operating range of the transmission.

12. A transmission comprising a hydraulic torque converter having an impeller, a rotor and a stator forming a fulcrum for torque multiplication, a planetary gear set having one element connected to the impeller and another element connected to the rotor, a second planetary gear set, means for holding one element of the second gear set against rotation in at least one direction, and shiftable clutch means for selectively connecting a third element of said first named planetary gear set to either of two other elements of said second planetary gear set.

13. A transmission comprising a hydraulic torque converter having an impeller, a rotor and a stator forming a fulcrum for torque multiplication, a planetary gear set having one element connected to the impeller, means for selectively connecting either of two other elements of said gear set to the rotor, a second planetary gear set, means for holding one element of the second planetary gear set against rotation in at least one direction, and means for selectively connecting either of said two other elements to another element of said second gear set thereby to drive the second gear set either forwards or backwards.

14. A transmission comprising a hydraulic torque converter having an impeller, a rotor and a stator forming a fulcrum for torque multiplication, a planetary gear set having one element connected to the impeller, means for selectively connecting either of two other elements of said gear set to the rotor, a second planetary gear set, means for holding one element of the second planetary gear set stationary, and clutch means for selectively connecting either of said other two elements to two other elements of the second gear set respectively thereby to provide forward drive in either high or low range or to provide reverse drive.

15. A transmission comprising a hydraulic torque converter having an impeller, a rotor and a stator forming a fulcrum for torque multiplication, a planetary gear set having one element connected to the impeller, means for selectively connecting either of two other elements of said gear set to the rotor, a second planetary gear set, means for holding one element of the second planetary gear set against rotation in one direction, means for connecting another element of the second gear set to that one of said two other elements which is not connected to the rotor, and clutch means for locking said second gear set to rotate as a unit.

16. A transmission comprising a hydraulic torque converter having an impeller, a rotor and a stator forming a fulcrum for torque multiplication, a planetary gear set having one element connected to the impeller, clutch members on two other elements of said gear set, a cooperating clutch member on the rotor, a second cooperating clutch member movably mounted on a fixed part, means for moving said last named clutch member into or out of position to engage said first-named clutch members, and means to shift said gear set to control said clutch members.

17. A transmission comprising a hydraulic torque converter having a driving and a driven member and a stator forming a fulcrum for torque multiplication, a planetary gear set having one element connected to the driving member, a second gear set driven by said driven member and driving another element of said planetary gear set, and clutch means for locking said second gear set to rotate as a unit thereby further to change the driving range of the transmission, while the planetary gear set transmits variable torque at varying speeds.

18. An infinitely variable speed and torque transmission connecting a driving shaft to a driven shaft comprising a variable torque unit and compound planet gears having primary and auxiliary sets of gears, the sun member of the primary set connected to the driving shaft and the ring member connected to the driven member of the variable torque unit via the auxiliary gear set and the primary cage member connected to the final driven shaft, so that the input power and torque is divided between the primary sun gear and the driving member of the variable unit to drive the driven member of the variable unit at varying speeds and torques, and drive the primary ring member at varying torques through the auxiliary gear set at ranges exceeding the torque range of the variable unit, and means to change the ratio of the auxiliary gear set to give a plurality of separate infinitely variable torque ranges at the output shaft.

19. A transmission comprising a hydraulic torque converter having a driving and a driven member, a planetary gear set having one element connected to the driving member, a second gear set having one element connected to said driven member and having another element connected to a second element of said planetary gear set, a driven shaft, and clutch means for selectively connecting said driven shaft either to a third element of said planetary gear set or to a third element of said second gear set.

ADIEL Y. DODGE.